Jan. 17, 1967   A. W. POMPER   3,298,061
EXTRUDER APPARATUS
Filed Feb. 25, 1964   2 Sheets-Sheet 1

*INVENTOR.*
ANTHONY W. POMPER
BY *Thomas N. Mayner*
ATTORNEY

INVENTOR.
ANTHONY W. POMPER
BY
ATTORNEY

3,298,061
EXTRUDER APPARATUS
Anthony W. Pomper, New Market, N.J., assignor to Midland-Ross Corporation, Cleveland, Ohio, a corporation of Ohio
Filed Feb. 25, 1964, Ser. No. 347,284
3 Claims. (Cl. 18—12)

This invention relates to injection and blow molding apparatus and, more particularly, to such apparatus utilizing an accumulator for the plastic material.

Generally, production advantages are derived from blow molding extruders operated on a continuous basis, putting out a constant volume of thermoplastic material which accumulates in an adjacent cylindrical chamber having a piston which predeterminedly forces out the accumulation into a connected mold. The quantity and frequency of ejection is varied in accordance with the article being molded and at a frequency designed into the apparatus. The extruders are further generally adapted to operate with a great variety of mold shapes and colors of the thermoplast. Where one kind of mold shape is used with a specific color thermoplast, a conversion can readily be made to another plastic in a different color. In such an instance, however, the previously used color generally is noticeable in the new molded wares for a considerable time indicating a stubborn residue of the previous plastic material. This results in an undesirable loss of production since the new extruded wares are imperfect in color. Flushing out of the extrusion system will eventually correct the condition but at a substantial loss of plastic material as well as time.

It has been found that the plastic material tends to build up and secure itself to the torpedo shaped piston plunger of the accumulator at a point opposite to the entry from the extruder barrel. Only repeated ejections will eventually wear down the build-up to eventually yield a complete new color. This undesirable condition has been substantially fully overcome by the improvement to be hereinafter described in the shape of the piston head of the accumulator ram which permits a more thorough flushing of the opposite side of the piston head. Where with a uniform diameter piston head, newly injected material would take the path of least resistance and flow over its face into the accumulator chamber ahead of it and not completely about it, the improvement directs substantial quantities of plastic completely about the piston torpedo face wiping it effectively and efficiently. Advantageously, the improvement of this invention, a relief of the torpedo head, redirects the flow of new material about the piston to reach and force out any latent residue. The changeover in thermoplastic color is thus substantially quickly accomplished minimizing the loss of thermoplast and time for any color change.

The improved accumulator ram piston head structure will be more fully understood from the following description and accompanying drawings, where:

Figure 1:
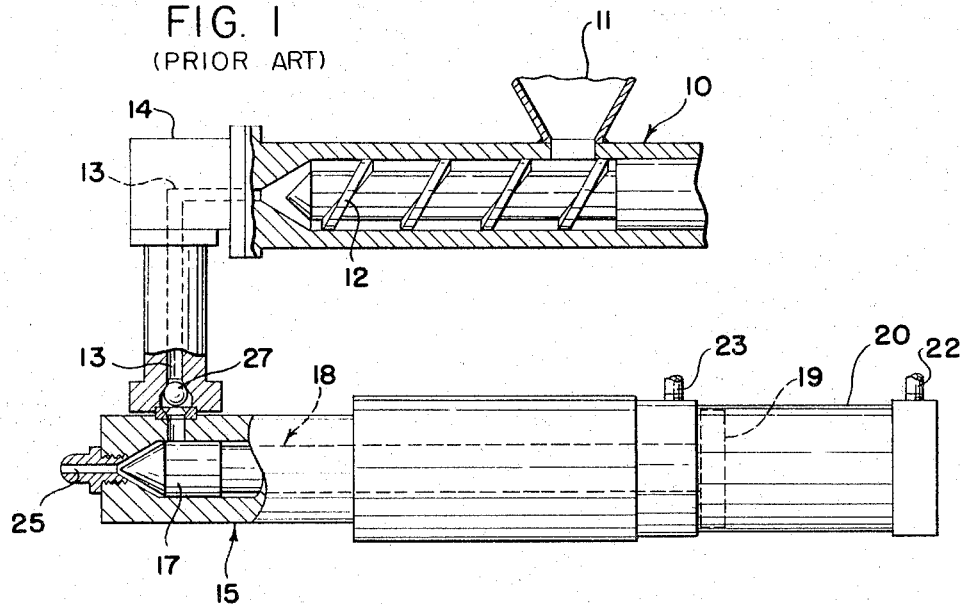
FIGURE 1 represents, in partial diagrammatic section, an extruder with an associated accumulator generally utilized by the injection molding industry.
Figure 2:
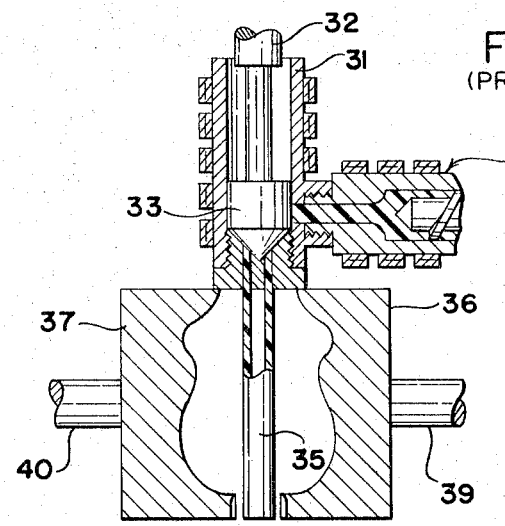
FIGURE 2 is a further representation, in partial section, of a generally acceptable arrangement for blow molding, showing an extruder apparatus with an accumulator, and mold.

In plastic extrusion, either the blow molding or injection type, where an accumulator is used, as indicated in FIGURES 1 and 2 of the drawings, the ram piston of a straight-forward bullet shaped design very seldom, if ever, is free and clear of plastic matter upon ejection action. Some plastic matter seems always to adhere to the lower, underneath, or opposite section to the plastic entry of the ram piston face being dislodged only bit by bit on subsequent forward thrusts by new plastic material. This, of course, is undesirable since small defects will be produced and become apparent in the molded or extruded article. This is especially undesirable where a change in color is desired. Cleaning out of the old plastic material by continued extrusion of the fresh and different colored plastic is a slow and expensive process. For example, the extruder 10 of FIGURE 1 is kept filled with plastic chips or pellets through the hopper 11, which are continually urged forwardly by a screw 12 where melting in the process into a plastic mass which is then continuously being expressed through a passage 13 in header 14 about a nonreturn valve 27 into an accumulator chamber 15 takes place. As shown, the torpedo shaped piston 17 of the ram 18 has been forced to its extremely forward position, being powered by hydraulic pressure acting on piston 19 in chamber 20, the pressure being admitted through inlet 22 and exhausted through outlet 23. While the piston 17 was being moved forwardly and prior to its cutting off of the passage 13, the plastic material in the accumulator because of increased pressure could not be forced back into the extruder but only through opening 25, the valve 27 being inactive until back pressure closed it. The ram operating cycle consumes but a few seconds. Upon total ejection and withdrawal, the cone-faced piston 17 pulls back and with it a small amount of plastic matter adhering to its lower face where the inflowing or new plastic material cannot reach it to sweep or wash it off.

The aforesaid adherence of plastic also tends to occur in blow molders 30 utilizing accumulators of the type shown in FIGURE 2. The torpedo shaped piston 33 of the ram 32 in accumulator 31 also will pull back some adhering plastic upon its return after an ejection of a parison 35 which subsequently will be blown to the interior form of companion mold halves 36, 37 forced into matching position by opposing pressure on rods 39, 40. The fresh inflowing plastic material cannot reach around the piston 33 nor force out the oppositely entrenched plastic matter on the undesired of its conical face. Generally, it takes a number of extrusions to eliminate or change the quantity of the residue clinging to the piston underside.

Figure 3:
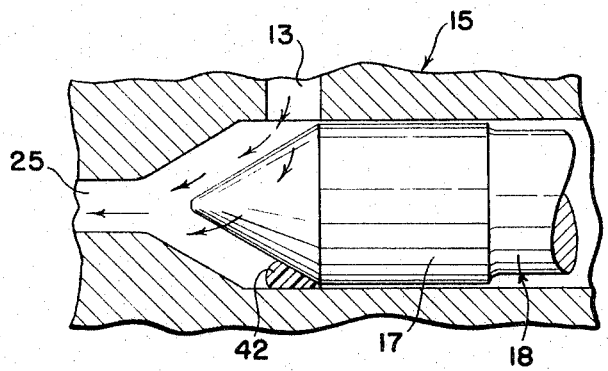
FIGURE 3 represents, in diagrammatic and partial section, a standard form of a piston head of a ram in an accumulator.

The adherence and the position of the plastic material 42 is more specifically shown in FIGURE 3. Here, the piston 17 of FIGURE 1 is shown on its way back to a fully withdrawn position with new plastic material flowing into the accumulator chamber through passage 13. The previous quantity was not fully expressed through header outlet 25 and the mass 42 adhering to the bottom of the piston 17, wedged in securely between the piston face and the chamber wall, continues to move back and forth with the ram 18. This small quantity or its fresh equivalent will tend to stick to the piston underside sometimes peeling in small sections to admix with that discharged. Advantageously, it has been discovered that by grooving and relieving the piston 17 so as to redirect the flow of fresh plastic completely about the piston and its face, all material would readily be forced out and the piston kept flushed clean. Such an improvement is shown in FIGURES 4 through 7.

Figure 4:
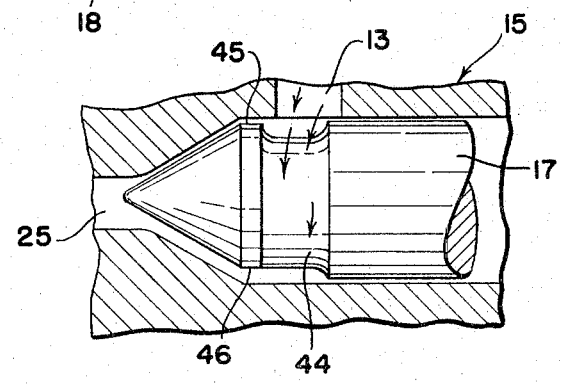
FIGURE 4 is a further diagrammatic, in partial section showing the relieved piston head of a ram in an accumulator.
Figure 5:
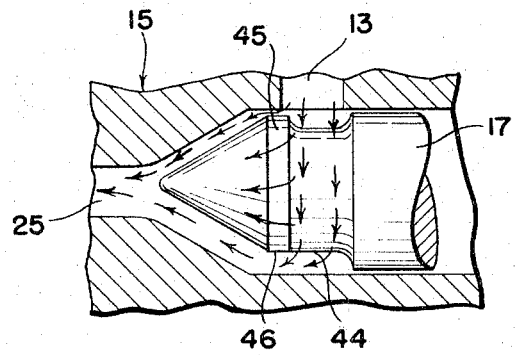
FIGURES 5, 6 represent the improved relieved, ram piston head in different positions in an accumulator to show the flow of plastic material thereabout.
Figure 6:
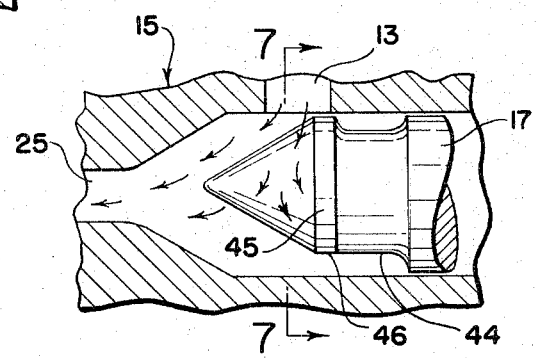

As shown in FIGURES 4–7, the piston 17 is circumferentially cut to provide a groove 44. Its torpedo face also is relieved over a section or arc of from 15° to about 30° from its point rearwardly and at the bottom to the depth of the groove 44. The relief 46 provides for a continuous flow of plastic material effecting a clean ejection of material from around the lower piston 17 face. The relief 46 of the piston 17 face then directs a continuous flow of plastic material from passage 13 down and around and through the groove 44 then through the formed increased space between the lower lessened torpedo face and the outlet 25, effectively washing or flushing the previously inaccessible lower section of piston 17. This flow of plastic is shown in FIGURES 5 and 6.

Figure 7:
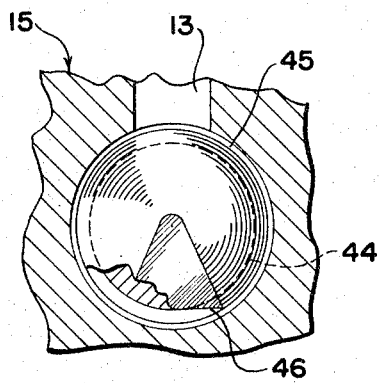
FIGURE 7 is a frontal view of FIGURE 6 across lines 7—7 of the relieved face of the ram piston head of FIGURES 4, 5, 6.

The frontal appearance of the relieved piston 17 torpedo face is shown in greater detail in FIGURE 7 as taken across line 7—7 of FIGURE 6. As shown, the depth of face relief is equal to about that of the groove 44 and runs from the face of the topedo to the groove. The clearance at the base is, over a small arc of the piston circumference, uniform from the normal diameter to the very point end as can be seen in FIGURE 4. The normal diameter 45 then has been cut at the piston 17 base to that of the groove 44 for over an arc of from 15° to about 30°. The depth of the groove 44 desirably is such so as to permit ready flow of plastic material about it, especially around the piston for an effective flushing of its face.

This improvement to an ejecting ram face or piston is advantageous in all situations where plastic is extruded, especially when colored plastic is used and where the color has to be changed. The extruder can be continued in operation during the change of colored plastic chips or beads thereto and production waste and downtime considerably minimized.

What is claimed is:

1. In a plastic extruding apparatus including a plastic accumulating chamber and a cylindrical ram therein for forcing out accumulated plastic, the ram having a cone shaped head, the head about prior to its conical taper and in the cylindrical section being circumferentially grooved and its conical face being partially relieved from about the cone apex point back to the groove.

2. In the apparatus of claim 1 where the depth of the relief of the torpedo face is substantially constant and equal to the extent of the groove depth.

3. In the apparatus of claim 1 where the relief is circumferential for over an arc of from 0° at the cone apex to 15-30° taken about the base of the cone and its depth being equal to the extent of the groove depth.

References Cited by the Examiner
UNITED STATES PATENTS

| | | | |
|---|---|---|---|
| 2,633,602 | 4/1953 | Sverdrup | 18—14 |
| 3,079,638 | 3/1963 | Mille | 18—12 |
| 3,089,192 | 5/1963 | Adams | 18—30 |
| 3,110,931 | 11/1963 | Kadel | 18—12 |
| 3,111,713 | 11/1963 | Kaplan | 18—14 |

J. SPENCER OVERHOLSER, *Primary Examiner.*

W. L. McBAY, *Assistant Examiner.*